United States Patent
Riach et al.

(10) Patent No.: US 8,049,761 B1
(45) Date of Patent: Nov. 1, 2011

(54) BUS PROTOCOL FOR TRANSFERRING PIXEL DATA BETWEEN CHIPS

(75) Inventors: Duncan A. Riach, Mountain View, CA (US); Michael A. Ogrinc, San Francisco, CA (US); Tyvis C. Cheung, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1027 days.

(21) Appl. No.: 11/937,031

(22) Filed: Nov. 8, 2007

(51) Int. Cl.
*G06F 13/14* (2006.01)

(52) U.S. Cl. .......................... 345/520; 345/519

(58) Field of Classification Search .................. 345/519, 345/520
See application file for complete search history.

(56) References Cited

U.S. PATENT DOCUMENTS

| | | | |
|---|---|---|---|
| 6,356,260 B1* | 3/2002 | Montalbo | 345/204 |
| 6,914,637 B1* | 7/2005 | Wolf et al. | 348/473 |
| 6,992,987 B2* | 1/2006 | Kobayashi | 370/252 |
| 7,058,967 B2* | 6/2006 | Graber et al. | 725/108 |
| 7,068,686 B2* | 6/2006 | Kobayashi | 370/522 |
| 7,088,398 B1* | 8/2006 | Wolf et al. | 348/423.1 |
| 7,222,355 B2* | 5/2007 | Meddaugh et al. | 725/82 |
| 7,257,163 B2* | 8/2007 | Hwang et al. | 375/242 |
| 7,266,629 B2* | 9/2007 | Honda | 710/305 |
| 7,283,566 B2* | 10/2007 | Siemens et al. | 370/486 |
| 7,295,578 B1* | 11/2007 | Lyle et al. | 370/503 |
| 7,337,463 B1* | 2/2008 | Rosenberg et al. | 725/146 |
| 7,558,326 B1* | 7/2009 | Lyle et al. | 375/244 |
| 7,664,895 B2* | 2/2010 | Nonoyama et al. | 710/71 |
| 7,755,588 B2* | 7/2010 | Chang | 345/98 |
| 7,821,483 B2* | 10/2010 | Su et al. | 345/98 |
| 2005/0262368 A1* | 11/2005 | Cherukuri et al. | 713/324 |
| 2006/0214902 A1* | 9/2006 | Tamura | 345/100 |
| 2007/0009060 A1* | 1/2007 | Lavelle et al. | 375/295 |
| 2007/0028013 A1* | 2/2007 | Nonoyama et al. | 710/33 |
| 2007/0273631 A1* | 11/2007 | Su et al. | 345/98 |
| 2007/0300032 A1* | 12/2007 | Berry et al. | 711/167 |
| 2008/0263237 A1* | 10/2008 | Yamamoto | 710/33 |
| 2009/0128475 A1* | 5/2009 | Chang | 345/98 |

* cited by examiner

*Primary Examiner* — Daniel Washburn
(74) *Attorney, Agent, or Firm* — Patterson & Sheridan, LLP (57) ABSTRACT

One embodiment of the present invention sets forth a protocol for packing and transferring pixel data between integrated circuits. The data transfer protocol may be used between a graphics processing unit and a video output encoder unit. The data transfers may include up to 20 pixels per arbitration cycle. By packing pixel data for transfer over a bus with a relatively small set of output pins, overall package pin count is reduced, while maintaining sufficient bandwidth to carry the pixel data the output pins. By moving the analog circuitry to a separate device, linked to the GPU via the bus, noise from the GPU may be effectively mitigate through physical separation.

20 Claims, 6 Drawing Sheets

BUS PROTOCOL FOR TRANSFERRING PIXEL DATA BETWEEN CHIPS

BACKGROUND OF THE INVENTION

1. Field of the Invention

Embodiments of the present invention relate generally to integrated circuit bus interfaces and more specifically to a bus protocol for transferring pixel data between chips.

2. Description of the Related Art

A graphics processing unit (GPU) typically includes at least one real-time video output port. An analog video output port incorporates a digital-to-analog converter (DAC) for generating analog video signals that are transmitted through output pins on the GPU to a display device, such as an LCD monitor. Incorporating at least one analog video output port is currently a requirement on high-volume GPU devices. Another type of real-time video output port incorporates a high-speed serial output resource for transmitting real-time video signals through output pins on the GPU to a display device. While both types of real-time video output ports are generally susceptible to on-chip noise generated by on-chip circuitry switching, the analog video output port is particularly sensitive. On-chip noise that couples to the circuitry associated with the analog real-time video output port can significantly degrade the quality of both the resulting analog video output signal and the final video image. Because noise naturally couples from a noise source, such as actively switching on-chip logic, to a noise victim, such as an on-chip analog circuit, substantial engineering effort is typically required to reduce noise in the analog video output signal.

As more logic gates are integrated into successive generations of GPU devices, the on-chip noise generated by switching logic will likely increase, thereby increasing the potential for switching noise to be coupled into the circuitry associated with an analog real-time video output port. The noise may be coupled through more than one mechanism. For example, substrate currents, electromagnetic coupling and inductive coupling may each inject significant noise into the analog real-time video output port, making mitigation strategies progressively less effective as more logic is integrated into future devices and more overall noise is generated in these devices.

One solution is to physically separate the switching logic and the sensitive analog video circuitry. However, this approach is costly in terms of die area, especially in systems with two independent analog video output ports that are used to support two different monitors. Another solution is to aggressively shield the analog video circuitry from the switching logic with on-chip metal barriers. However, these shields are generally not effective against inductively coupled noise, a significant contribution to overall coupled noise within an integrated circuit.

As the foregoing illustrates, what is needed in the art is a system that decouples noise sources from analog video output circuitry in a GPU, while minimizing overall design effort.

SUMMARY OF THE INVENTION

One embodiment of the invention sets forth a system for transmitting isochronous data for display. The system includes a first integrated circuit that includes a host interface, a second integrated circuit that includes a target interface, and a data bus coupling the host interface to the target interface and including a host data path that comprises twenty differential pairs for transmitting twenty bits of data per rising edge of a reference clock signal and twenty bits of data per falling edge of the reference clock signal. For each data phase cycle, the host interface is configured to transmit forty bits of data to the target interface via the host data path such that twenty thirty-six bit pixels may be transmitted to the target interface in eighteen data phase cycles.

One advantage of the disclosed system is that, by moving the analog circuitry associated with any analog video output ports from the GPU, where switching noise is abundant, to a separate device, noise related problems in the analog video signal are effectively mitigated. Further, by packing the video data into a relatively narrow channel, pin count costs on the GPU are mitigated. An additional advantage of this architecture is that the GPU may take early advantage of new processor technology, without requiring a redesign of the video encoder unit coupled to the new processor.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
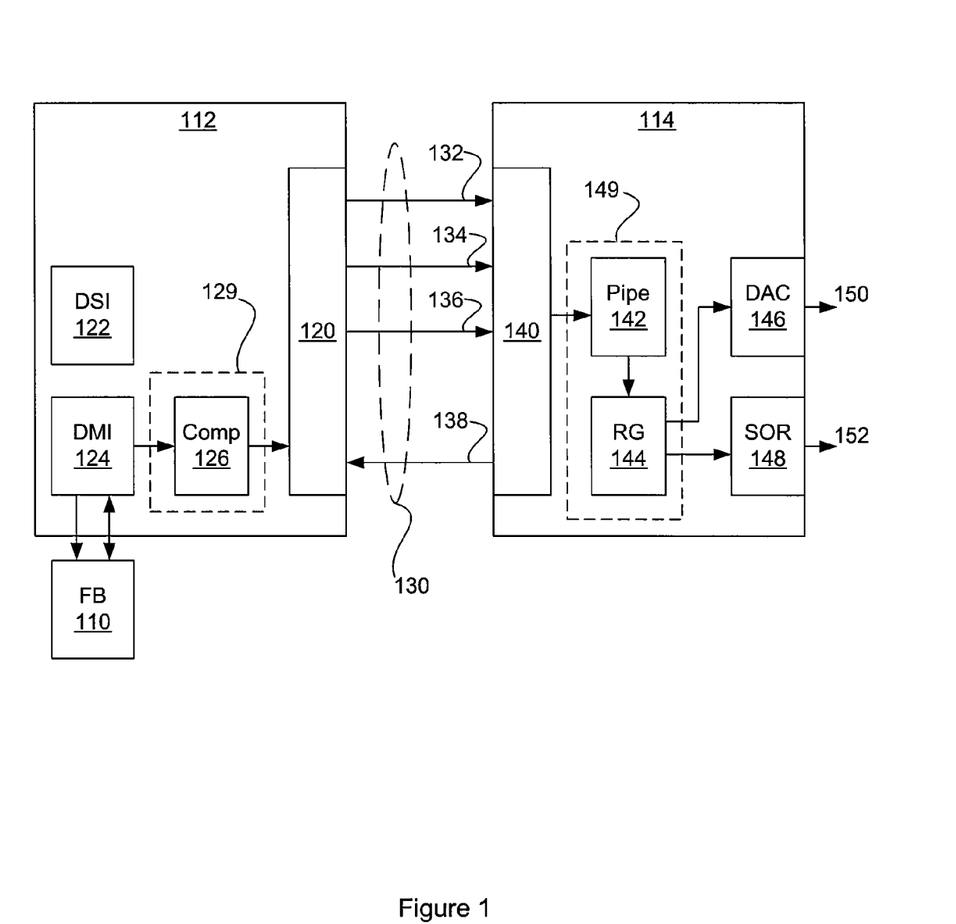
FIG. 1 depicts integrated circuits in which one or more aspects of the invention may be implemented.

FIG. 1 depicts integrated circuits in which one or more aspects of the invention may be implemented. The first integrated circuit may be a graphics processing unit (GPU) 112 with an attached frame buffer memory (FB) 110. The second integrated circuit may be a video encoder unit 114 configured to communicate with the GPU 112 via a chip-to-chip video bus 130.

The GPU 112 may include, without limitation, a display software interface (DSI) 122, a display memory interface (DMI) 124, a compositor (comp) 126 and a host interface 120. The DSI 122 provides software with a register-level view of configuration and status parameters related to video display generation and processing within the GPU 112. For example, a GPU software driver (not shown) may configure the video display functions within the GPU 112 via the DSI 122. The DMI 124 provides the comp 126 with at least one access interface to frame buffer data, such as video image data, stored within the FB 110. The comp 126 generates a sequence of video images for display based on one or more source images. The source images may include, without limitation, a base image, an overlay image, and a cursor image. The host interface 120 encodes the video images generated by the comp 126 for transmission over the chip-to-chip video bus 130. The host interface 120 also decodes incoming data received from the chip-to-chip video bus 130. A "head" 129 includes the logic necessary to control and configure a display device (not shown). Within the GPU 112 the head 129 includes an instance of the comp 126. A single GPU 112 may include a plurality of heads, each used to control and configure a display device.

The chip-to-chip video bus 130 includes a host data path 132, a control flag 134, a reference clock 136, and a target data path 138. In one embodiment, the host data path 132 includes twenty differential pairs, allowing twenty bits to be transmitted per clock edge of the reference clock 136. The resulting data transmission rate is forty bits for each full clock cycle (twenty bits per rising edge and twenty bits per falling edge). The target data path 138 may include four differential pairs, allowing four bits to be transmitted per clock edge of the reference clock 136. The resulting data transmission rate is eight bits for each full clock cycle (four bits per rising edge and four bits per falling edge). The chip-to-chip video bus 130 is discussed in greater detail in FIGS. 3, 4 and 5.

The video encoder unit 114 may include, without limitation, a target interface 140, a video-processing pipe (pipe) 142, a raster generator (RG) 144, a serial output resource (SOR) 148 that generates a serial digital video signal 152, and a digital-to-analog converter (DAC) 146 that generates an analog video signal 150.

The target interface 140 decodes video image data received from the chip-to-chip video bus 130 and provides the data to the pipe 142. The pipe 142 performs any video processing, such as color space conversion, gamma-correction, or filtering to generate a stream of processed video image data. The RG 144 receives the processed video image data and structures the data according to any encoding or timing requirements of the serial digital video signal 152 or the analog video signal 150. The DAC 146 converts the output data stream from the RG 144 into the analog video signal 150 through any technically feasible process of analog-to-digital conversion. The SOR 148 converts the output data stream from the RG 144 into a structured high-speed video data stream, such as the industry standard digital video interface (DVI) high-speed video data stream format. A head 149 within the video encoder unit 114 includes an instance of the pipe 142 and the RG 144. A video encoder unit 114 may include a plurality of heads, each including an instance of the pipe 142 and the RG 144. Each head can be used to drive an independent display device.

Figure 2:
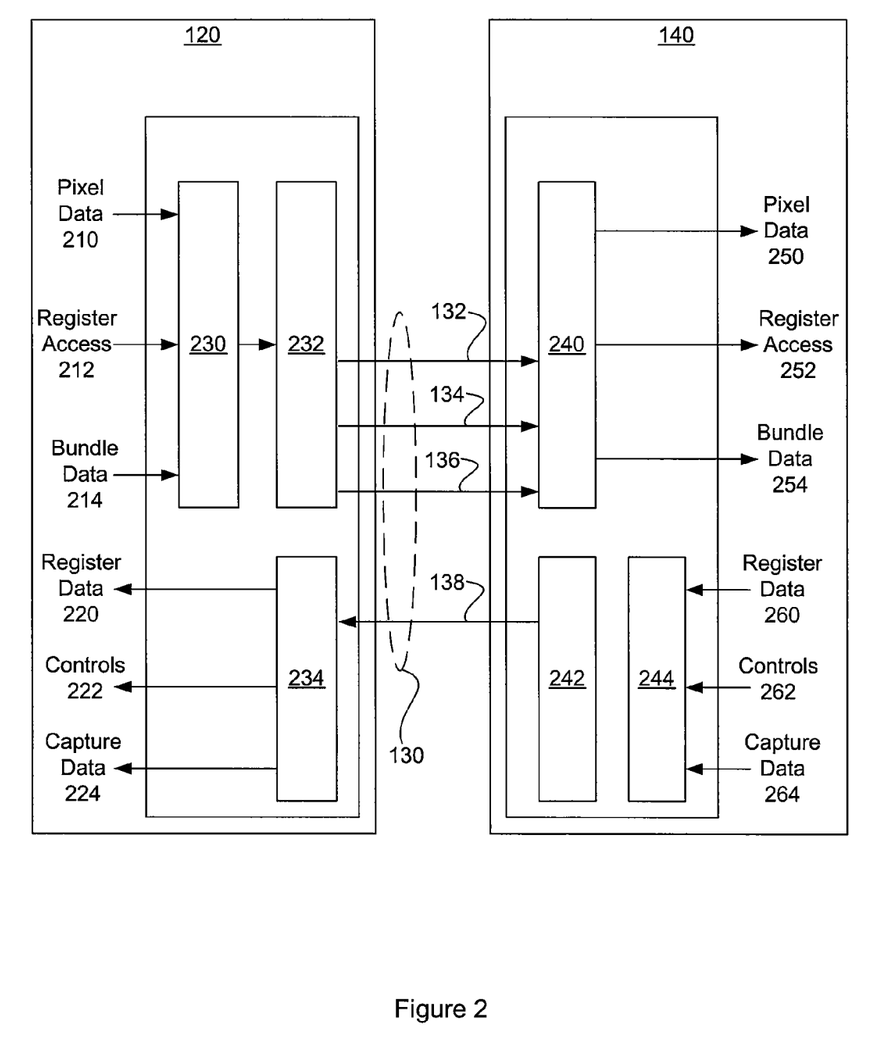
FIG. 2 depicts the major functional blocks of a host interface and a target interface, according to one embodiment of the invention.

FIG. 2 depicts the major functional blocks of a host interface 120 and a target interface 140, according to one embodiment of the invention. The host interface 120 includes an arbiter 230, a packer 232, and an un-packer 234. The target interface 140 includes an un-packer 240, a packer 242, and an arbiter 244.

The arbiter 230 receives requests to transmit pixel data 210, register access requests 212, and bundle data 214. The arbiter 230 grants access to one request at any one time. Pixel data 210 may be real-time video image data. Register access may be read and write requests used to configure or examine the state of the target interface 140. Bundle data 214 is used to convey sets of configuration data to the target interface 140. The data associated with the granted request is packed by the packer 232 for transmission over the chip-to-chip video bus 130. The process of packing data for transmission is discussed in greater detail in FIGS. 3, 4 and 5.

The un-packer 234 receives data from the chip-to-chip video bus 130. This data may be, without limitation, register data 220, controls 222 or capture data 224. Register data 220 is read reply data generated in response to a read request posted from a register access request 212. Controls 222 are configuration and control signals related to the target interface 140 operation. Capture data 224 may be video or audio data captured by the target interface 140.

The un-packer 240, within the target interface 140 unpacks data received through the chip-to-chip video bus 130 and routes the unpacked data to the appropriate target. For example, pixel data 250 may be routed to the pipe 142 within the video encoder unit 114. Register accesses 252 may be routed to configuration or status registers, and bundle data 254 may be routed to a unit within the video encoder unit 114 configured to process bundle data.

The arbiter 244 receives requests to transmit register data 260, controls 262 and capture data 264. The arbiter 244 grants access to one request at any one time. The data associated with the granted request is packed by the packer 242 for transmission over the chip-to-chip video bus 130.

Figure 3:
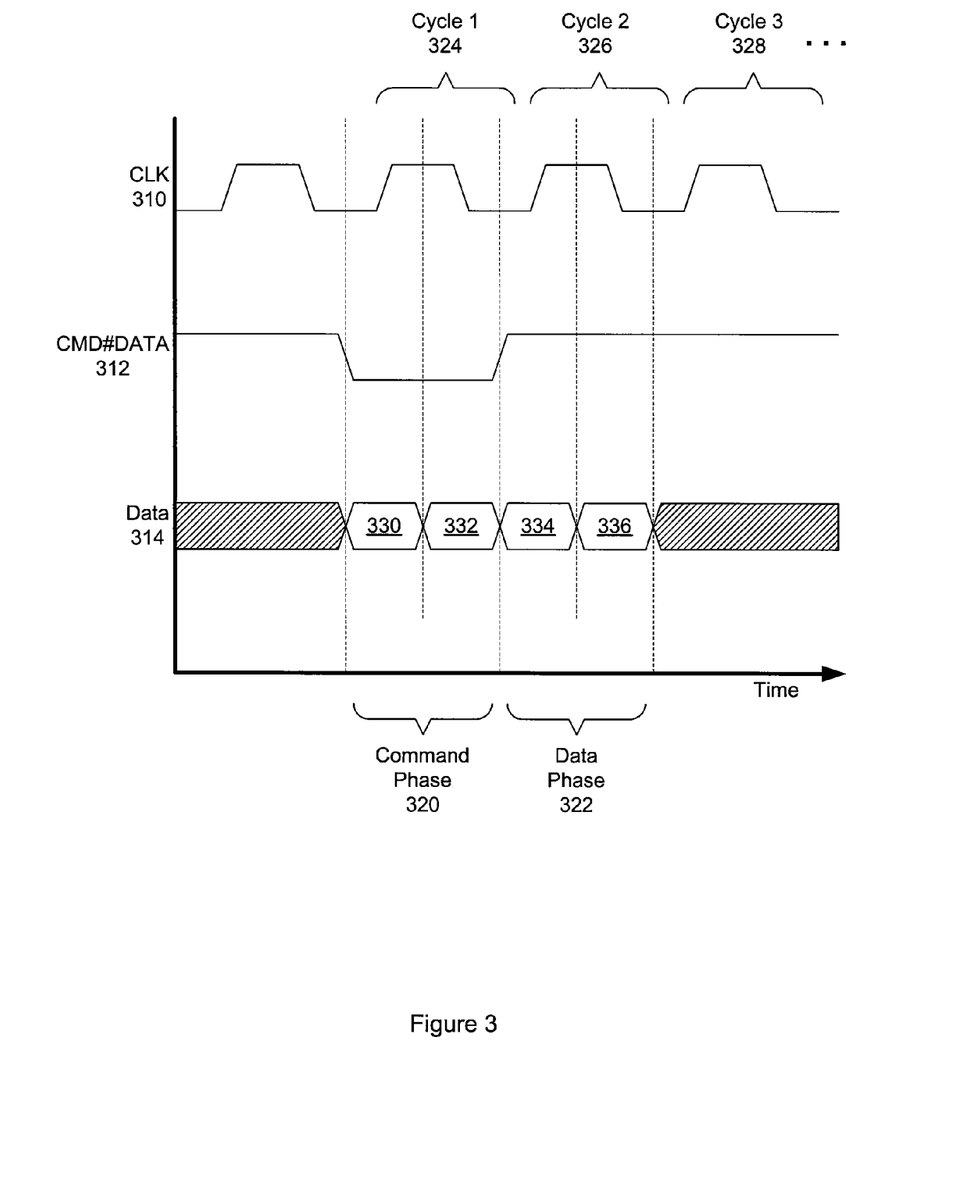
FIG. 3 illustrates a portion of a protocol that includes a command phase cycle and a data phase cycle relative to a reference clock signal, according to one embodiment of the invention.

FIG. 3 illustrates a portion of a protocol that includes a command phase cycle and a data phase cycle relative to a reference clock signal 310, according to one embodiment of the invention. A CMD#DATA signal 312 indicates the start of a command phase 320 (cycle 1 324), which is followed by at least one data phase 322 (cycle 2 326). Data within the command phase 320 is transmitted in two sub-phases. The first sub-phase 330 is associated with the rising edge of CLK 310. The second sub-phase 332 is associated with the falling edge of CLK 310. Similarly, data within a given data phase 322 is transmitted in two sub-phases 334 and 336, associated with the rising and falling edges of CLK 310, respectively. A second data phase (not shown) would immediately follow data phase 322 in cycle 3 328.

Figure 4:
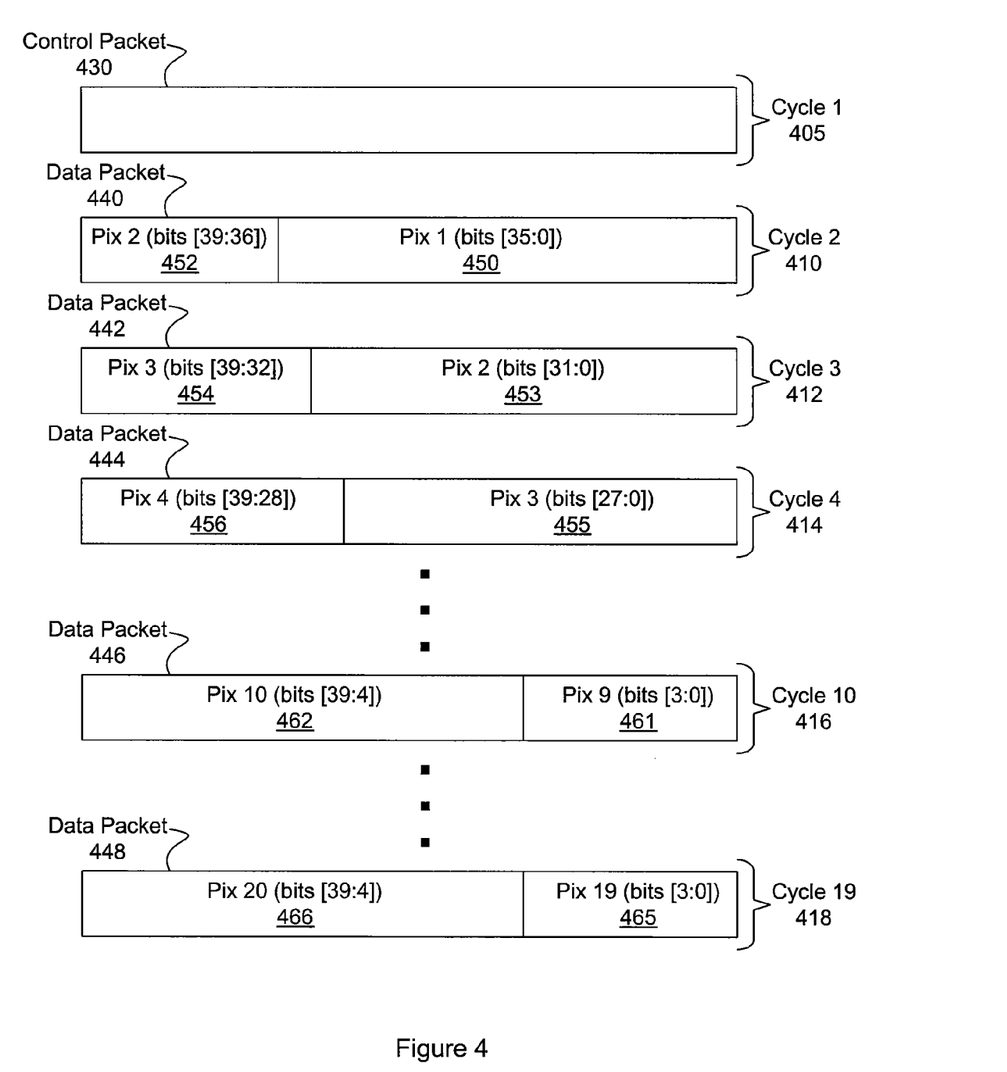
FIG. 4 illustrates how pixel data bits are packed within the data phase cycles of the protocol, according to one embodiment of the invention.

FIG. 4 illustrates how pixel data bits are packed within the data phase cycles of the protocol, according to one embodiment of the invention. A control packet 430 is transmitted in cycle 1 405, according to the timing illustrated in FIG. 3. For example, cycle 1 405 may correspond to cycle 1 324 of FIG. 3. Similarly, cycle 2 410 corresponds to cycle 2 326, and so on. The control packet 430 includes a pixel count (not shown) that indicates how many pixels should be transmitted subsequent to the control packet 430. This pixel count is used to determine how many additional cycles should follow the control packet 430.

In one embodiment, a pixel includes thirty-six bits of data. Pixel (pix) 1 450 is positioned in the lower thirty-six bits of the forty bit word in cycle 2 410. If a second pixel, pix 2, is transmitted, then four bits pix 2 452 are transmitted in the upper four bits of the forty bit data word transmitted in cycle 2 410. The remaining thirty-two bits 453 of pix 2 are transmitted in cycle 3 412. If a third pixel, pix 3 is transmitted, then eight bit of pix 3 454 are also transmitted in cycle 3 412. The remaining twenty-eight bits of pix 3 are transmitted in cycle 4 414, and so on. In cycle 10 416, four bits of pix 9 461 may be transmitted, along with all thirty-six bits of pix 10 462. An additional ten pixels may be transmitted using the same packing scheme through cycle 19 418. As shown, all thirty-six bits of pix 20 466 may be transmitted in cycle 19 418.

Figure 5:
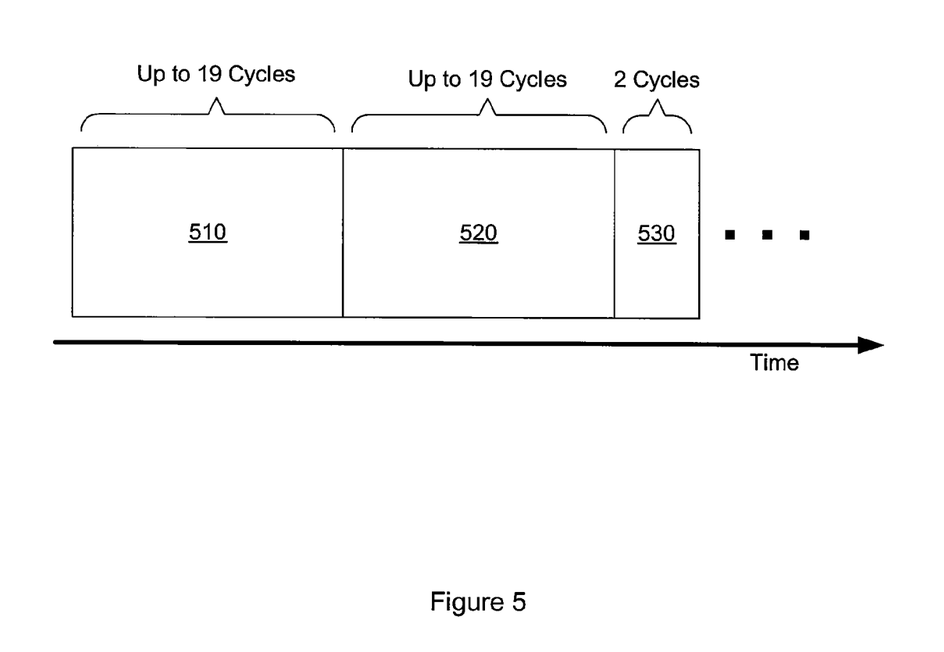
FIG. 5 depicts a sequence of protocol-based data transfers, according to one embodiment of the invention.

FIG. 5 depicts a sequence of protocol-based data transfers, according to one embodiment of the invention. A first data transfer 510 includes data for up to twenty pixels, packed into up to nineteen cycles, as illustrated in FIG. 4. A second data transfer 520 similarly includes data for up to twenty pixels, packed into up to nineteen cycles. Pixel data may be characterized as isochronous, having real-time delivery requirements. Additional non-isochronous data 530, such as register reads and writes, which do not have hard real-time delivery requirements may also be transmitted over the chip-to-chip video bus 130, as shown. The arbiter 230 determines which data transfers are to be performed at any time. The arbiter 230 may assign priority to isochronous data, or may simply perform a "round-robin" arbitration, whereby sufficient bandwidth may be guaranteed for both isochronous and non-isochronous data transfers during a given arbitration cycle. In one embodiment, non-isochronous transfers are limited to two cycles, including one control packet and one data packet.

Figure 6:
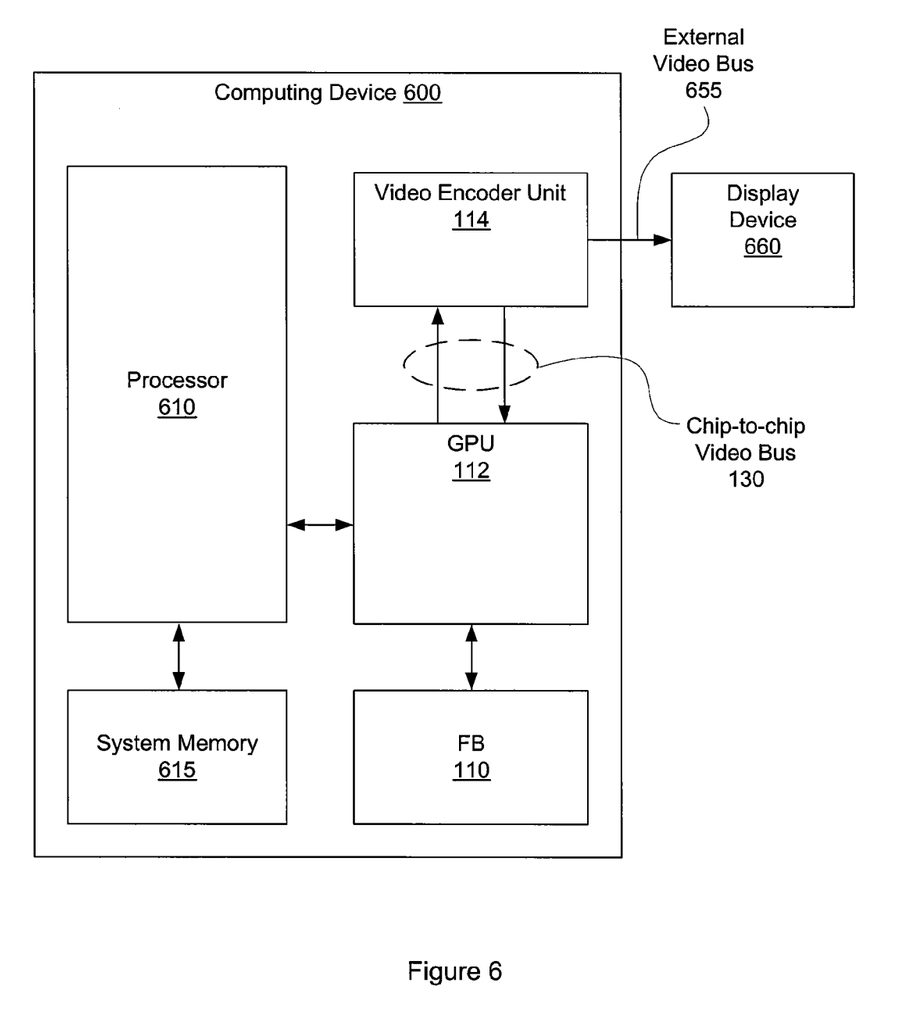
FIG. 6 depicts a computing device in which one or more aspects of the invention may be implemented.

FIG. 6 depicts a computing device 600 in which one or more aspects of the invention may be implemented. The computing device 600 includes, without limitation, a processor 610, system memory 615, a graphics processing unit (GPU) 112, a local frame buffer (FB) memory 110 connected to the GPU 112, a video encoder unit 114 and a chip-to-chip video bus 130 used to transmit protocol-based transfers between the GPU 112 to the video encoder unit 114. A display device 660 may be attached to the computing device 600 via an external video bus 655. Persons skilled in the art will recognize that any system having one or more processing units configured to implement the teachings disclosed herein falls within the scope of the present invention. Thus, the architecture of computing device 600 in no way limits the scope of the present invention.

In sum, a technique is disclosed for structuring arbitrated data transfers from a source of real-time video data, on a first integrated circuit, to a video output encoder unit, on a second chip. The video output encoder unit is used to format and transmit the real-time video data to a display device. The data transfers may include up to 20 pixels per arbitration grant. Each pixel includes 36 bits, which are packed into 40-bit words. The words are transferred 20-bits at a time on alternating edges of a reference clock.

By moving the analog circuitry associated with any analog video output ports from the GPU, where switching noise is abundant, to a separate device, noise related problems in the analog video signal are effectively mitigated. By packing the video data into a relatively narrow channel, pin count costs on the GPU are mitigated. An additional advantage of this architecture is that the GPU may take early advantage of new processor technology, without requiring a redesign of the video encoder unit coupled to that new processor.

While the forgoing is directed to embodiments of the present invention, other and further embodiments of the invention may be devised without departing from the basic scope thereof. For example, aspects of the present invention may be implemented in hardware or software or in a combination of hardware and software. Therefore, the scope of the present invention is determined by the claims that follow.

We claim:

1. A system for transmitting isochronous data for display, the system comprising:
a first integrated circuit that includes a host interface;
a second integrated circuit that includes a target interface; and
a data bus coupling the host interface to the target interface and including a host data path that comprises twenty differential pairs for transmitting twenty bits of data per rising edge of a reference clock signal and twenty bits of data per falling edge of the reference clock signal,
wherein, for each data phase cycle, the host interface is configured to transmit forty bits of data to the target interface via the host data path such that twenty thirty-six bit pixels may be transmitted to the target interface in eighteen data phase cycles.

2. The system of claim 1, wherein the first integrated circuit comprises a graphics processing unit, and the second integrated circuit comprises a video encoder unit.

3. The system of claim 1, wherein, for a command phase cycle, the host interface is configured to transmit forty bits of control data to the target interface via the host data path.

4. The system of claim 3, wherein the host interface is configured to transmit one forty-bit control packet during a command phase cycle and then one forty-bit data packet during one or more consecutive data phase cycle.

5. The system of claim 1, wherein the host interface includes an arbiter and packing unit.

6. The system of claim 5, wherein the arbiter is configured to arbitrate among a plurality of data sources and to select data from one of the data sources for transmission to the target interface via the host data path.

7. The system of claim 6, wherein the packing unit is configured to receive data from the selected data source and to assemble the data into one or more forty-bit data packets for transmission to the target interface via the host data path.

8. The system of claim 7, wherein a first data packet assembled by the packing unit includes data associated with a first pixel and data associated with a second pixel.

9. The system of claim 6, wherein pixel data is isochronous data, and the arbiter is configured to give priority to a pixel data source when arbitrating among the plurality of data sources.

10. The system of claim 1, wherein the data bus further includes a control flag, a reference clock and a target data path that comprises four differential pairs.

11. A computing device configured for transmitting isochronous data for display, the computing device comprising:
a central processing unit coupled to a system memory;
a first integrated circuit coupled to the central processing unit and including a host interface;
a second integrated circuit that includes a target interface; and
a data bus coupling the host interface to the target interface and including a host data path that comprises twenty differential pairs for transmitting twenty bits of data per rising edge of a reference clock signal and twenty bits of data per falling edge of the reference clock signal,
wherein, for each data phase cycle, the host interface is configured to transmit forty bits of data to the target interface via the host data path such that twenty thirty-six bit pixels may be transmitted to the target interface in eighteen data phase cycles.

12. The computing device of claim 11, wherein the first integrated circuit comprises a graphics processing unit, and the second integrated circuit comprises a video encoder unit.

13. The computing device of claim 12, wherein, for a command phase cycle, the host interface is configured to transmit forty bits of control data to the target interface via the host data path.

14. The computing device of claim 13, wherein the host interface is configured to transmit one forty-bit control packet during a command phase cycle and then one forty-bit data packet during one or more consecutive data phase cycles.

15. The computing device of claim 12, wherein the host interface includes an arbiter and packing unit.

16. The computing device of claim 15, wherein the arbiter is configured to arbitrate among a plurality of data sources and to select data from one of the data sources for transmission to the target interface via the host data path.

17. The computing device of claim 16, wherein the packing unit is configured to receive data from the selected data source and to assemble the data into one or more forty-bit data packets for transmission to the target interface via the host data path.

18. The computing device of claim 17, wherein a first data packet assembled by the packing unit includes data associated with a first pixel and data associated with a second pixel.

19. The computing device of claim 16, wherein pixel data is isochronous data, and the arbiter is configured to give priority to a pixel data source when arbitrating among the plurality of data sources.

20. The computing device of claim 12, wherein the data bus further includes a control flag, a reference clock and a target data path that comprises four differential pairs.

* * * * *